US011681937B2

(12) United States Patent
Hood

(10) Patent No.: US 11,681,937 B2
(45) Date of Patent: Jun. 20, 2023

(54) SYSTEM, METHOD, AND PLATFORM FOR GENERATING A REAL-TIME BET WIN PROBABILITY

(71) Applicant: The Action Network, Inc., New York, NY (US)

(72) Inventor: Daniel Hood, Marina Del Rey, CA (US)

(73) Assignee: THE ACTION NETWORK, INC., New York, NY (US)

( * ) Notice: Subject to any disclaimer, the term of this patent is extended or adjusted under 35 U.S.C. 154(b) by 221 days.

(21) Appl. No.: 16/993,881

(22) Filed: Aug. 14, 2020

(65) Prior Publication Data

US 2021/0049490 A1 Feb. 18, 2021

Related U.S. Application Data

(60) Provisional application No. 62/886,645, filed on Aug. 14, 2019.

(51) Int. Cl.
*G06N 20/00* (2019.01)
*G06N 7/01* (2023.01)

(52) U.S. Cl.
CPC .............. *G06N 7/01* (2023.01); *G06N 20/00* (2019.01)

(58) Field of Classification Search
CPC . G07F 17/3244; G07F 17/3225; H05B 45/10; G06Q 30/0206
See application file for complete search history.

(56) References Cited

U.S. PATENT DOCUMENTS

| | | | |
|---|---|---|---|
| 7,175,522 B2 | 2/2007 | Hartl | |
| 8,360,835 B2 | 1/2013 | Strause et al. | |
| 8,758,111 B2 | 6/2014 | Lutnick | |
| 8,764,553 B2 | 7/2014 | Ginsberg et al. | |
| 9,111,417 B2 | 8/2015 | Leen et al. | |
| 9,652,926 B2 | 5/2017 | Gelman et al. | |
| 9,805,549 B2 | 10/2017 | Asher et al. | |
| 9,947,174 B2 | 4/2018 | Rangarajan et al. | |
| 11,113,929 B1 | 9/2021 | Reeder et al. | |
| 2005/0021442 A1 | 1/2005 | Flake et al. | |
| 2005/0021461 A1 | 1/2005 | Flake et al. | |
| 2007/0072679 A1* | 3/2007 | Kerns | A63F 13/12 463/42 |
| 2007/0259707 A1 | 11/2007 | Kang | |
| 2008/0085770 A1 | 4/2008 | Morgan | |
| 2011/0250974 A1 | 10/2011 | Shuster | |
| 2013/0217475 A1 | 8/2013 | Guan | |
| 2014/0122316 A1 | 5/2014 | Flake et al. | |
| 2015/0018077 A1* | 1/2015 | Heaton | G07F 17/3232 463/25 |
| 2015/0260693 A1* | 9/2015 | DeMarco | H05B 45/10 324/693 |
| 2016/0086441 A1 | 3/2016 | Cohen et al. | |
| 2016/0253877 A1 | 9/2016 | Hoss et al. | |
| 2017/0243438 A1* | 8/2017 | Merati | G07F 17/3244 |
| 2017/0372561 A1* | 12/2017 | Aronson | G07F 17/3246 |
| 2018/0130302 A1 | 5/2018 | De Knijff | |

(Continued)

*Primary Examiner* — Saba Dagnew
(74) *Attorney, Agent, or Firm* — Venable LLP; Ryan T. Ward

(57) ABSTRACT

A system, method, and electronic online platform provide a probability of a wager winning in real-time updates as live in-game data is provided to a model calculating a current probability of winning based on historical betting data.

18 Claims, 3 Drawing Sheets

(56) References Cited

U.S. PATENT DOCUMENTS

| | | | |
|---|---|---|---|
| 2018/0247325 A1* | 8/2018 | Melzer | G06Q 30/0206 |
| 2018/0357857 A1 | 12/2018 | Simon et al. | |
| 2022/0084368 A1* | 3/2022 | Merati | G06Q 50/34 |
| 2022/0130207 A1 | 4/2022 | Huke et al. | |
| 2022/0230510 A1 | 7/2022 | Seidel et al. | |

* cited by examiner

SYSTEM, METHOD, AND PLATFORM FOR GENERATING A REAL-TIME BET WIN PROBABILITY

CROSS REFERENCE TO RELATED APPLICATIONS

This application claims the benefit of U.S. Provisional Patent Application No. 62/886,645, filed on Aug. 14, 2019, the contents of which are fully incorporated by reference herein.

BACKGROUND

The embodiments herein relate generally to wagering systems and more particularly, to systems, methods, and platforms for generating real-time bet win probabilities.

Current probability calculators are used to calculate odds of teams winning or losing events. However, many bettors bet on aspects of a game other than the outcome of the game. Information from existing probability calculators is irrelevant to people who have bet on these different aspects of the game. If a particular bettor's interest is in the different aspects of the game other than game outcome, the probabilities calculated by existing probability calculators are not helpful. Accordingly, there is a need to provide users with probabilities related to wagers or bets on many different aspects of a game.

SUMMARY

According to an embodiment, a computer program product for generating a probability of winning of wagers is disclosed. The computer program comprises a non-transitory computer readable storage medium having computer readable program code embodied therewith. The computer readable program code is configured, when executed by a computer processing unit, to: generate a model that predicts the probability of a particular type of bet winning over the course of a game from historical data; store a wager for a user account; receive live in-game data for the stored wager; compare the stored wager to the live in-game data according to the generated model; and generate a real-time winning probability for the stored wager based on the generated model using the live in-game data.

According to an embodiment, a method for generating a win probability is disclosed. The method comprises determining, by the computer, a first data set, wherein the first data set comprises a wager from a user on the game; receiving, by a computer, a second data set, wherein the second data set comprises game data of a game; comparing, by the computer, the first and second data sets to a predetermined win probability model; calculating, by the computer, a win probability of the wager based on the predetermined win probability model; and displaying the win probability to the user.

A non-transitory computer readable medium having stored thereon software instructions that, when executed by a processor, cause the processor to generate a win probability for a wager is disclosed. The processor executes the steps comprising determining, by the computer, a first data set, wherein the first data set comprises a wager from a user on the game; receiving, by a computer, a second data set, wherein the second data set comprises game data of a game; comparing, by the computer, the first and second data sets to a predetermined win probability model; calculating, by the computer, a win probability of the wager based on the predetermined win probability model; and displaying the win probability to the user.

BRIEF DESCRIPTION OF THE FIGURES

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

In general, and referring to the Figures, the described embodiments address problems associated with tracking the win probability of wagers or bets of many different aspects of a game, including aspects that do not include game outcome. According to an embodiment, more relevant and accurate in-game information is provided to bettors based on their specific types of wagers or bets. For example, specific and relevant in-game information and odds are calculated for users in real-time. Real-time delivery of information on a user's wagers or bets allows users to quickly adjust their betting strategy.

Figure 1:
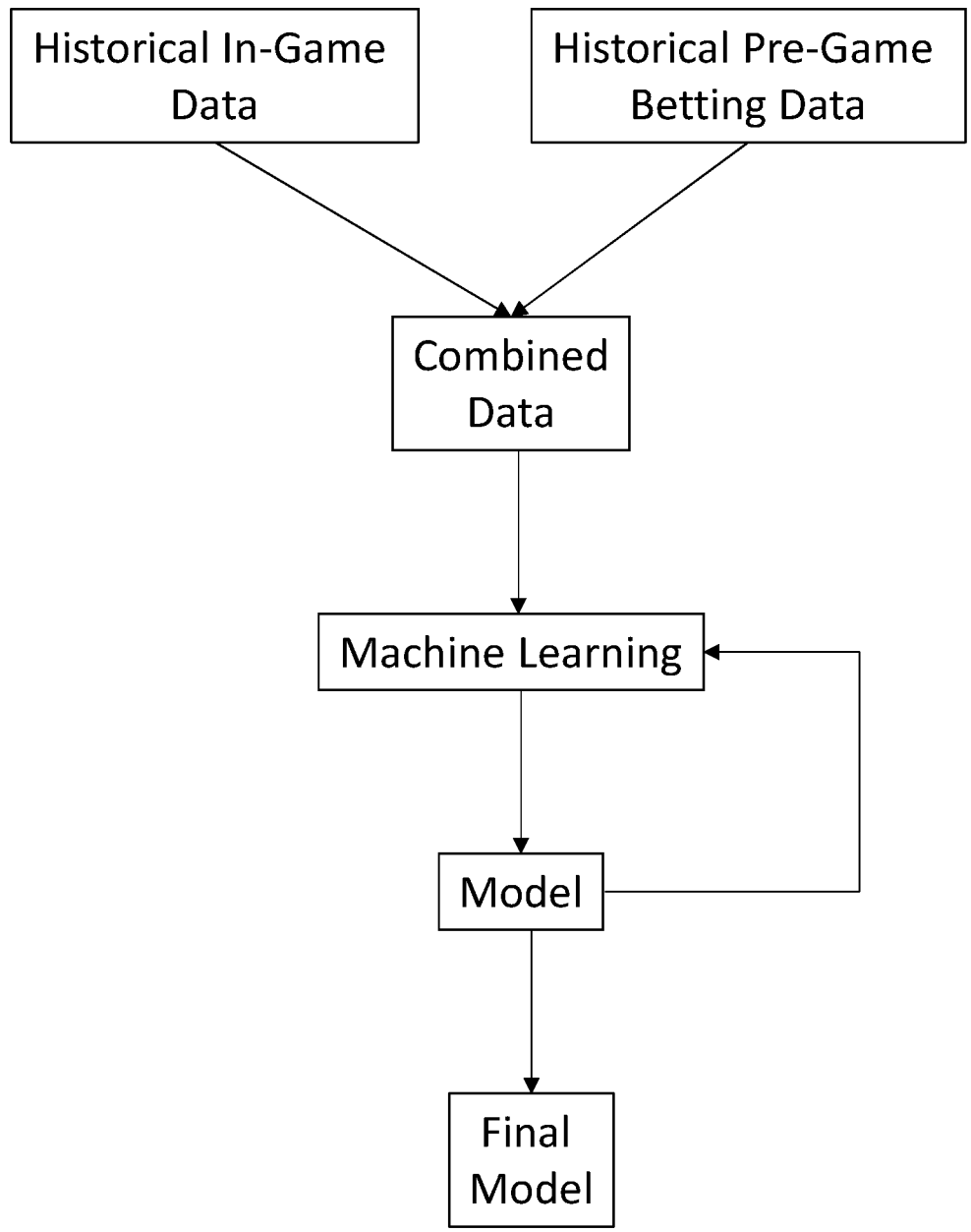
FIG. 1 is a process diagram of a bet win probability model development according to an embodiment.

FIG. 1 illustrates a process performed by a computer to develop a win probability model. According to an embodiment, the win probability model may be trained using at least two different data sets related to one or more preselected history games. For example, one historical game may be selected. For the selected historical game, the computer may generate a first data set of in-game data by accessing stored historical data on the game. For example, the in-game data may be specific to the sport, such as time remaining in the game, total elapsed time of the game, score, data specific to a football game (e.g., down, distance, current yardline, team possession, number of timeouts remaining/taken by a team, etc.), data specific to a basketball game (e.g., possession arrow or team possession of the ball, number of timeouts remaining/taken by a team, score per minute, points scored by minute by a team, etc.), data specific to a baseball game (e.g. strikes and/or balls for an at-bat, total strikes and/or balls in an inning, total strikes and/or balls in a game, number of outs, hitter order, baserunners, etc.), and/or data specific to other types of game or sports.

For the same selected historical game, the computer may generate a second data set of betting data on the selected historical game by accessing stored betting data on the game. As described above, the betting data may include pre-game betting data for the game, such as, for example, opening and closing moneylines, opening and closing spreads, opening and closing game totals, public betting percentage toward each side, public money percentage toward each side, number of bets, and other types of data related to the bets or wagers.

According to an embodiment, any number of historical games may be selected to build the training data set. For example, selecting a plurality of historical games would increase the size of the first and second data sets. According to a different embodiment, first and second data sets may be generated for each of the plurality of selected games, so that the number of total data sets is increased when a historical game is added to the list of selected games, or the number of total data sets is decreased when a historical game is removed from the list of selected games.

According to an embodiment, the first and second data sets may be merged by the computer into a single or merged data set as the training data set. For example, the first and second data sets may be merged into a single unified corpus of game data in order to train the model, as described below. According to an embodiment, the first and second data sets are grouped and normalized into the merged data set or single unified corpus of game data groups that can be passed as a single data set to train the model.

In order to develop the win probability model or algorithm, the training data set may be applied to one or more machine learning algorithms or neural networks. For example, a supervised machine-learning algorithm, linear regression, K-Nearest Neighbors, Decision Trees, and/or other types of algorithms or models may be used. Based on the first and second data sets, the one or more machine learning algorithms or neural networks, such as described above, can determine the win probability model or an algorithm. For example, the one or more machine learning algorithms or neural networks may compare game related information to betting information about the game (for example, opening betting market lines, closing betting market lines, etc.), and any other relevant data source information. For example, the win probability model or algorithm may correlate game characteristics or events with wager outcomes (e.g., win or loss).

According to an embodiment, development of the win probability model may be iterative in order to increase accuracy or optimize the resulting model. For example, the model may be tuned or optimized by comparing or evaluating the model based on live observation and historical trends. When the model is optimized, the computer may store a final win probability algorithm or model as a stored win probability algorithm or model.

According to an embodiment, the win probability model is configured to predict a probability of a particular type of bet winning over the course of a game. For example, as a game progresses, the model is configured to adjust the win probability of a particular bet as variables of the game change, such as score, time remaining, and/or other in-game variable provided by the first data set.

Figure 2:
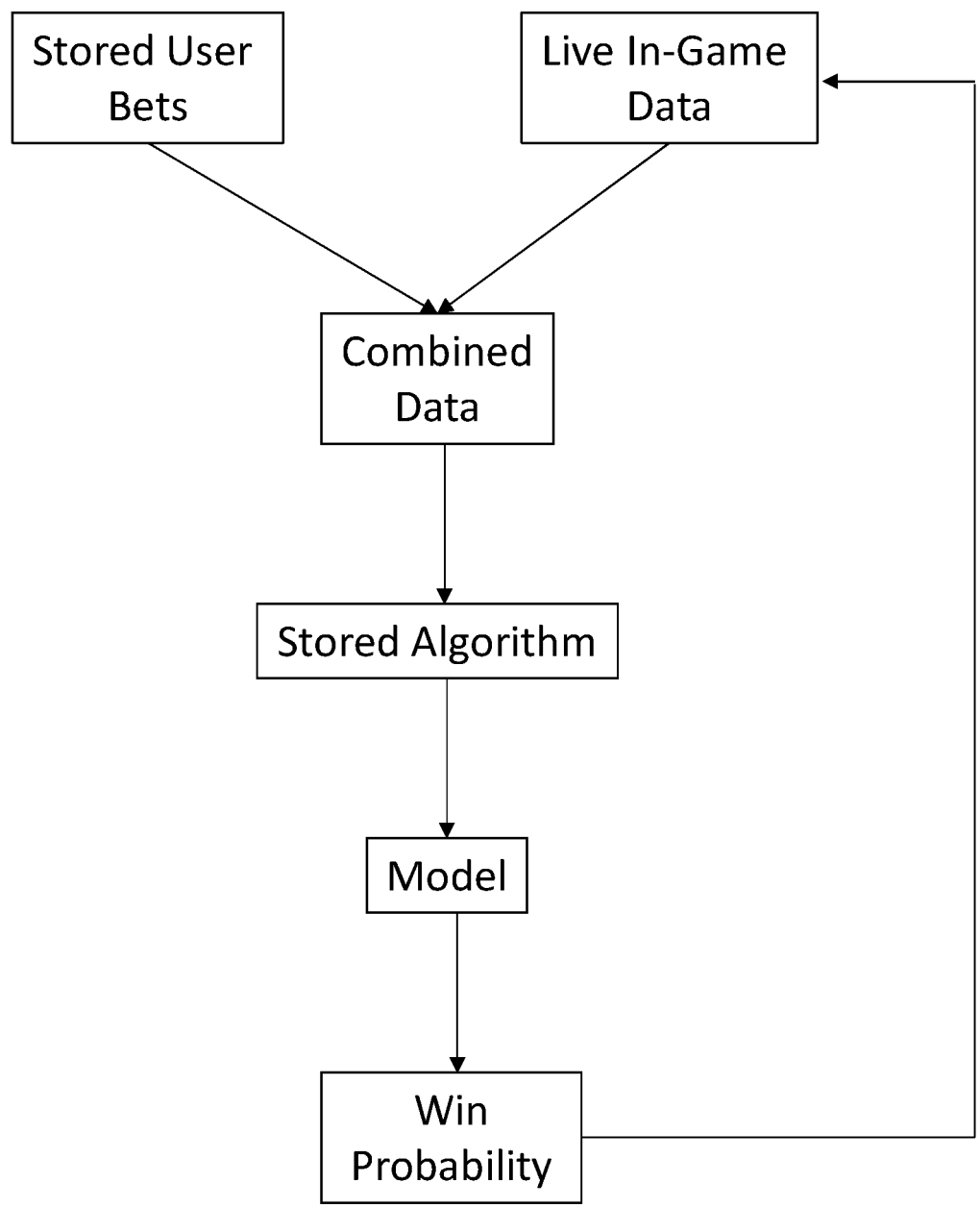
FIG. 2 is a process diagram of a bet win probability model implementation, according to an embodiment.

FIG. 2 illustrates an implementation process for the stored win probability algorithm for a user's bets on one or more games. According to an embodiment, the computer may store a first data set including one or more bets or wagers may by the user for the one or more games. The computer may store a second data set including data specific to the event-type or sport of the respective one or more events or games, such as real-time or live in-game data, including time remaining in the game, total elapsed time of the game, score, data specific to a football game (e.g., down, distance, current yardline, team possession, number of timeouts remaining/taken by a team, etc.), data specific to a basketball game (e.g., possession arrow or team possession of the ball, number of timeouts remaining/taken by a team, score per minute, points scored by minute by a team, etc.), data specific to a baseball game (e.g. strikes and/or balls for an at-bat, total strikes and/or balls in an inning, total strikes and/or balls in a game, number of outs, hitter order, baserunners, etc.), and/or data specific to other types of game or sports. The second data set may be received by the computer via an application programming interface (API), communicated to the computer via a data connection, and/or downloaded by the computer. For example, the first and second data sets may collectively be a feed data set for the stored win probability algorithm.

According to an embodiment, the first and second data sets may be merged by the computer into a single or merged data set as the feed data set. For example, the first and second data sets may be merged into a single unified corpus of game data in order to pass the stored win probability algorithm or model, as described below. According to an embodiment, the first and second data sets are grouped and normalized into the merged data set or single unified corpus of game data groups that can be passed as a single data set to the algorithm or model.

As explained in more detail below, the feed data set may be updated periodically or continuously with in-game data and/or bets throughout the course of the one or more games, at predetermined events during the one or more games, and/or upon a request of the user.

The stored win probability algorithm or model can be applied to the feed data set in order to predict the win probability of the stored user bets on the one or more games. For example, the computer can compare the first and second data sets to the stored win probability algorithm or model to determine the win probability for a specific wager or bet. If the amount of the user's bet is also known, the probability can be multiplied by the bet amount to calculate the bet's expected value. The win probability and/or expected value of the stored user bets may be displayed to the user on a user computer or device.

As explained above, the live in-game data represents the real-time or live in-game data of the one or more games. Accordingly, the live in-game data may change continuously through the course of the one or more games. Accordingly, the win probability calculated by the stored win probability algorithm may be updated by updating the feed data set periodically or continuously throughout the course of the one or more games, at predetermined events during the one or more games, and/or upon a request of the user. For example, the feed data set may be updated 1-second, 30-second, 1-minute, or at another predetermined time interval. For example, the feed data set may be updated periodic intervals of elapsed time or time remaining of a game, such as 1-second, 30-second, 1-minute, or at another predetermined time interval. The win probability may also be updated based on a predetermined event determined from the second data set. For example, as the second data set is updated (whether periodically or in real-time), the second data set may be monitored for one or more predetermined events in the game. When the system determines that one or more of the predetermined events occurs in the game, it can update the win probability of the bet or wager to display to the user. Accordingly, as the win probability is updated, the win probability and/or expected value of the stored user bets as they vary over time and/or event and may be displayed to the user on the user computer or device.

According to an embodiment, when the one or more games are complete and the outcome of the user bets or wagers is known, the win probability model for the user may be updated by updated the first and second data sets described with respect to FIG. 1.

Accordingly, and as may be appreciated, the user may be updated in real-time concurrently with the action unfolding in a game associated with the user's wager(s). As the game unfolds, specific wagers related to the game action may be updated as to their probability of winning so the user can, for example, place additional bets in response to their current probabilities of winning.

As described above, the embodiments are described with respect to a win probability model. It is also contemplated that the embodiments be use a loss probability model or other statistically relevant characterization to calculate a loss probability or other statistically relevant probability of a bet or wager.

Figure 3:
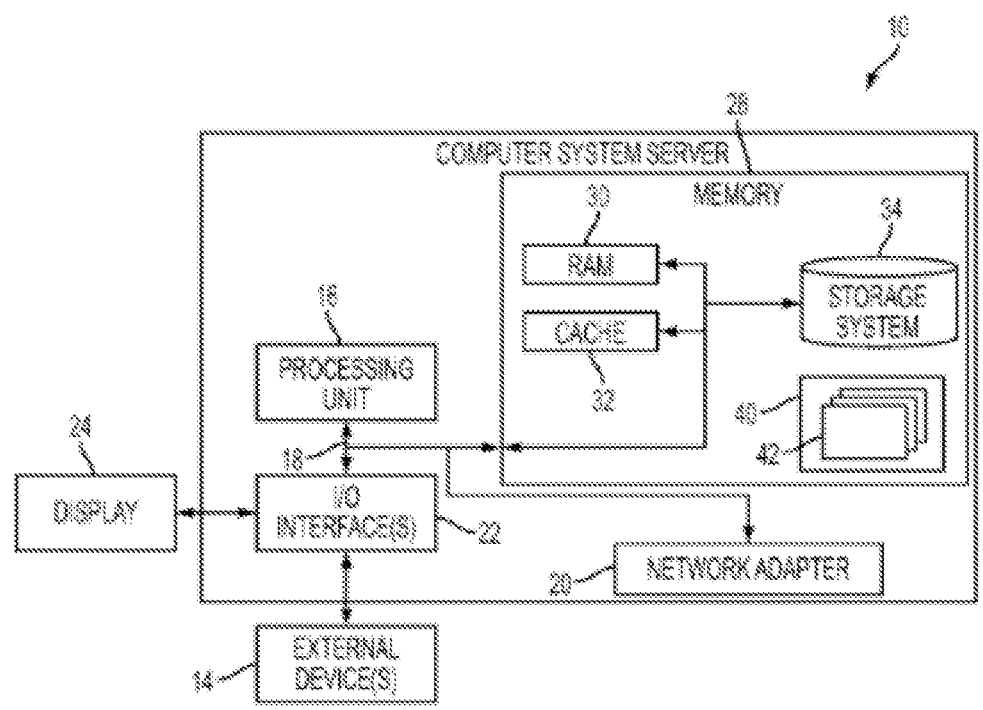
FIG. 3 is a block diagram of a computing device, according to an embodiment.

Referring now to FIG. 3, a schematic of an example of a computer system/server 10 is shown. The computer system/server 10 is shown in the form of a general-purpose computing device. The components of the computer system/server 10 may include, but are not limited to, one or more processors or processing units 16, a system memory 28, and a bus 18 that couples various system components including the system memory 28 to the processor 16. In some embodiments, the computer system/server 10 may be a cloud computing node connected to a cloud computing network (not shown). The computer system/server 10 may be for example, personal computer systems, tablet devices, mobile telephone devices, server computer systems, handheld or laptop devices, multiprocessor systems, microprocessor-based systems, set top boxes, programmable consumer electronics, network PCs, wearable computing devices, and distributed cloud computing environments that include any of the above systems or devices, and the like. Users may use any of the computer systems 10 to interface with a software embodiment to engage with the posting of wagers and generation of real-time winning probabilities as described above. In some embodiments, the invention may be a hosted application and platform which is administered by a server type computer system/server 10. In this context, data or signals from the user-controlled computer systems 10 may be sent to a server(s) 10 to invoke the processes described above. The computer system/server 10 may be described in the general context of computer system executable instructions, such as program modules, being executed by a computer system (described for example, below). The computer system/server 10 may be practiced online which may include distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as describe herein. For example, the program modules 42 may execute the steps for receiving wagers, accessing pre-game historical betting data, accessing live in-game data, feeding data related to stored bets and current in-game data to an algorithm to generate a probability of winning for individual bets, and calculating an expected current probability of bets winning as described above.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (just X, or just Y, or just Z) and multiple items (i.e., {X and Y}, {X and Z}, {Y and Z}, or {X, Y, and Z}). "At least one of" is not intended to convey a requirement that each possible item must be present.

Although the foregoing description is directed to the embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

I claim:

1. A method for generating a win probability, the method comprising:
   receiving, at a computer system, a first data set, wherein the first data set comprises a wager from a user on sports event;
   receiving, at the computer system, a second data set, wherein the second data set comprises game data of the sports event;
   combining, via at least one processor of the computer system, the first data set with the second data set, resulting in a combined data set;
   training, via the at least one processor executing a machine learning training algorithm using a historical data set, a win probability model, wherein the historical data set comprises:
     historical game data associated with at least one historical game; and
     historical wager data associated with the at least one historical game;
   iteratively executing, via the at least one processor, the win probability model, wherein inputs to the win probability model comprise the combined data set, resulting in a win probability of the wager;
   tuning the win probability model based on at least one of live observation and historical trends; and
   displaying the win probability to the user.

2. The method of claim 1, wherein the game data of the sports event comprises real-time game data of an ongoing sports event.

3. The method of claim 1, further comprising:
   updating the second data set using updated game data, resulting in an updated second data set; and
   re-executing, via the at least one processor, the win probability model using the updated win probability based on the updated second data set.

4. The method of claim 3, wherein the second data set is updated in real-time during the sports event.

5. The method of claim 3, wherein the second data set is updated at a predetermined time interval.

6. The method of claim 3, further comprising:
   determining a predetermined event has occurred in the sports event based on the updated second data set; and
   wherein the re-executing of the win probability model occurs after determining the predetermined event has occurred.

7. The method of claim 1, wherein the win probability model is generated using an algorithm, the algorithm comprising at least one of a supervised machine-learning algorithm, a linear regression algorithm, a k-nearest neighbors algorithm, a decision tree algorithm, and a neural network.

8. The method of claim 7, wherein the algorithm correlates a game characteristic and a wager outcome.

9. A non-transitory computer readable medium having stored thereon software instructions that, when executed by a processor, cause the processor to generate a win probability of a wager, by executing the steps comprising:
   receiving a first data set, wherein the first data set comprises a wager from a user on sports event;
   receiving a second data set, wherein the second data set comprises game data of the sports event;
   combining the first data set with the second data set, resulting in a combined data set;
   training, by executing a machine learning training algorithm using a historical data set, a win probability model, wherein the historical data set comprises:
     historical game data associated with at least one historical game; and
     historical wager data associated with the at least one historical game;
   iteratively executing the win probability model, wherein inputs to the win probability model comprise the combined data set, resulting in a win probability of the wager;
   tuning the win probability model based on at least one of live observation and historical trends; and
   displaying the win probability to the user.

10. The non-transitory computer readable medium of claim 9, wherein the game data of the sports event comprises real-time game data of an ongoing sports event.

11. The non-transitory computer readable medium of claim 9, further comprising:
   updating the second data set using updated game data, resulting in an updated second data set; and
   re-executing, via the at least one processor, the win probability model using the updated win probability based on the updated second data set.

12. The non-transitory computer readable medium of claim 11, wherein the second data set is updated in real-time during the sports event.

13. The non-transitory computer readable medium of claim 11, wherein the second data set is updated at a predetermined time interval.

14. The non-transitory computer readable medium of claim 11, further comprising:
   determining a predetermined event has occurred in the sports event based on the updated second data set; and
   wherein the re-executing of the win probability model occurs after determining the predetermined event has occurred.

15. The non-transitory computer readable medium of claim 9, wherein the win probability model is generated using an algorithm, the algorithm comprising at least one of a supervised machine-learning algorithm, a linear regression algorithm, a k-nearest neighbors algorithm, a decision tree algorithm, and a neural network.

16. The non-transitory computer readable medium of claim 15, wherein the win probability model correlates a game characteristic and a wager outcome.

17. The method of claim 1, further comprising:
   receiving, at the computer system after the generation of the win probability, updated historical data;
   comparing, via the at least one processor, the win probability to the updated historical data, resulting in a comparison; and
   retraining, via the at least one processor executing the machine learning training algorithm using the historical data set and the updated historical data, the win probability model.

18. The non-transitory computer readable medium of claim 9, having additional instructions stored which, when executed by the processor, cause the processor to perform operations comprising:
- receiving, after the generation of the win probability, updated historical data;
- comparing the win probability to the updated historical data, resulting in a comparison; and
- retraining, by executing the machine learning training algorithm using the historical data set and the updated historical data, the win probability model.

\* \* \* \* \*